(12) United States Patent
Kim

(10) Patent No.: US 8,407,467 B2
(45) Date of Patent: Mar. 26, 2013

(54) UBIQUITOUS AUDIO REPRODUCING AND SERVICING METHOD AND APPARATUS

(75) Inventor: Jong-bae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1430 days.

(21) Appl. No.: 11/766,396

(22) Filed: Jun. 21, 2007

(65) Prior Publication Data
US 2008/0181313 A1    Jul. 31, 2008

(30) Foreign Application Priority Data

Jan. 25, 2007    (KR) .................. 10-2007-0007903

(51) Int. Cl.
*H04L 29/06*    (2006.01)
(52) U.S. Cl. .......... 713/161; 713/165; 726/21; 380/201; 380/202; 380/232; 375/240.28; 375/240.27
(58) Field of Classification Search .................. 713/165; 380/201–202
See application file for complete search history.

(56) References Cited

U.S. PATENT DOCUMENTS

| | | | |
|---|---|---|---|
| 6,385,596 B1 * | 5/2002 | Wiser et al. ..................... 705/51 |
| 6,481,632 B2 * | 11/2002 | Wentker et al. ................ 235/492 |
| 6,779,115 B1 * | 8/2004 | Naim ............................. 713/192 |
| 7,334,051 B2 * | 2/2008 | Koyata et al. ................. 709/246 |
| 7,340,055 B2 * | 3/2008 | Hori et al. ...................... 380/201 |
| 7,610,488 B2 * | 10/2009 | Sueyoshi et al. .............. 713/169 |
| 7,666,122 B2 * | 2/2010 | Chiles et al. ..................... 482/52 |
| 8,051,302 B1 * | 11/2011 | Hatanaka et al. ............. 713/193 |
| 8,256,009 B2 * | 8/2012 | Kim et al. ........................ 726/27 |
| 2002/0052847 A1 * | 5/2002 | Shioda et al. .................... 705/51 |
| 2002/0184154 A1 * | 12/2002 | Hori et al. ........................ 705/50 |
| 2003/0014630 A1 * | 1/2003 | Spencer et al. ............... 713/168 |
| 2005/0143129 A1 * | 6/2005 | Funk et al. ..................... 455/560 |
| 2005/0195975 A1 * | 9/2005 | Kawakita ........................ 380/30 |
| 2005/0262550 A1 * | 11/2005 | Torii ................................ 726/2 |
| 2006/0101295 A1 * | 5/2006 | Park ............................... 713/300 |
| 2006/0166173 A1 * | 7/2006 | Ellis et al. ..................... 434/185 |
| 2007/0042767 A1 * | 2/2007 | Stepanian ..................... 455/420 |
| 2007/0056042 A1 * | 3/2007 | Qawami et al. ................ 726/26 |

(Continued)

FOREIGN PATENT DOCUMENTS

CN    1885917    12/2006

OTHER PUBLICATIONS

Jonker W, Digital rights management in consumer electronics products, Mar. 2004, IEEE, vol. 21, pp. 4-9.*

(Continued)

*Primary Examiner* — Nathan Flynn
*Assistant Examiner* — Viral Lakhia
(74) *Attorney, Agent, or Firm* — Stanzione & Kim, LLP

(57) ABSTRACT

A ubiquitous audio reproducing and servicing method and apparatus for streaming or downloading a lossless audio source from a Content Provider (CP) using a lossy audio source card as an authentication key. The ubiquitous audio reproducing method includes determining whether a memory card storing lossy audio sources and their authentication codes is inserted, if it is determined that the memory card is inserted, transmitting an authentication code of a lossy audio source in the memory card and a system unique Identifier (ID) to a content server by connecting to the content server via a network, and if the content server allows the use of a lossless audio source corresponding to the lossy audio source using the authentication code, streaming or downloading the lossless audio source from the content server.

14 Claims, 4 Drawing Sheets

U.S. PATENT DOCUMENTS

| | | | |
|---|---|---|---|
| 2007/0100860 A1* | 5/2007 | Jung et al. | 707/101 |
| 2007/0143592 A1* | 6/2007 | Kitani | 713/150 |
| 2007/0157318 A1* | 7/2007 | Lee et al. | 726/27 |
| 2007/0198430 A1* | 8/2007 | Takahashi et al. | 705/59 |
| 2007/0283151 A1* | 12/2007 | Nakano et al. | 713/168 |
| 2007/0288715 A1* | 12/2007 | Boswell et al. | 711/164 |
| 2008/0114980 A1* | 5/2008 | Sridhar | 713/168 |
| 2008/0189099 A1* | 8/2008 | Friedman et al. | 704/8 |
| 2008/0219638 A1* | 9/2008 | Haot et al. | 386/68 |

OTHER PUBLICATIONS

Chinese Office Action issued Jun. 9, 2010 in CN Application No. 200710138225.3.

* cited by examiner

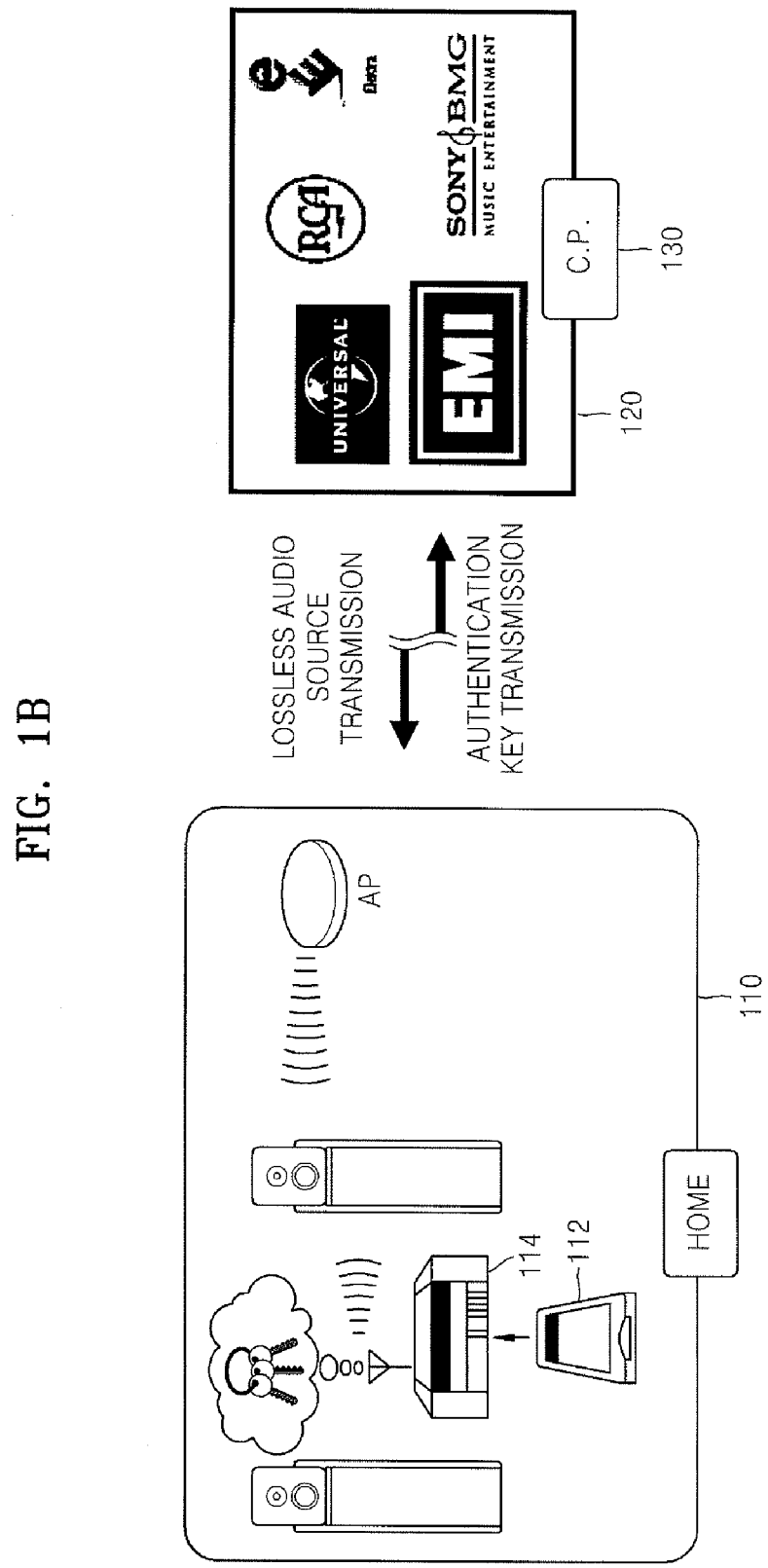

| INDEX | AUDIO DATA | ARTIST | GENRE | . . . . . . | AUTHENTICATION CODE |
|---|---|---|---|---|---|
| 1 | xxx.mp3 | xxx | BALLAD | . . . . . . | xxxx |
| 2 | xxx.mp3 | xxx | POP SONG | . . . . . . | xxxx |
| ⋮ | ⋮ | ⋮ | ⋮ | | ⋮ |

UBIQUITOUS AUDIO REPRODUCING AND SERVICING METHOD AND APPARATUS

CROSS-REFERENCE TO RELATED APPLICATIONS

This application claims the benefit of Korean Patent Application No. 10-2007-0007903, filed on Jan. 25, 2007, in the Korean Intellectual Property Office, the disclosure of which is incorporated herein in its entirety by reference.

BACKGROUND OF THE INVENTION

1. Field of the Invention

The present general inventive concept relates to a ubiquitous audio system, and more particularly, to a ubiquitous audio reproducing and servicing method and apparatus to stream or download a lossless audio source from a Content Provider (CP) using a lossy audio source card as an authentication key.

2. Description of the Related Art

Generally, audio content is reproduced from MP3, Compact Disc (CD), Mini Disc (MD), or audio book. The CD has good sound quality due to non-compression and can be personally collected. However, it is difficult to protect copyrights due to ripping (extracting various types of music files from the CD), and the original may be damaged due to scratches.

The audio book is suitable for a portable use and the right protection of a content provider, however, is not suitable for high fidelity (hi-fi) audio due to low sound quality.

The MP3 is suitable for a portable use, however, it is difficult to countermeasure illegal copy.

SUMMARY OF THE INVENTION

The present general inventive concept provides a ubiquitous audio reproducing and servicing method and apparatus to generate hi-fi audio and to plan right protection of a Content Provider (CP) by streaming or downloading a lossless audio source provided by the CP using a memory card storing a lossy audio source as an authentication key.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a ubiquitous audio reproducing method including determining whether a memory card storing one or more lossy audio sources and their authentication codes is inserted, if it is determined that the memory card is inserted, transmitting an authentication code of the lossy audio source in the memory card and a system unique Identifier (ID) to a content server by connecting to the content server via a network, and if the content server allows the use of a lossless audio source corresponding to the lossy audio source using the authentication code, streaming or downloading the lossless audio source from the content server.

The foregoing and/or other aspects and utilities of the present general inventive concept may also be achieved by providing a ubiquitous audio servicing method including generating an authentication key using a memory card storing one or more lossy audio sources and content authentication codes, receiving a content authentication code in the memory card and a unique Identifier (ID) of a home audio system into which the memory card is inserted from the home audio system, determining based on the received content authentication code whether relevant content is genuine, and providing a lossless audio source corresponding to the content authentication code to the home audio system according to whether the relevant content is genuine.

The foregoing and/or other aspects and utilities of the present general inventive concept may also be achieved by providing a ubiquitous audio reproducing apparatus including a card insertion unit to receive a memory card storing one or more lossy audio sources and content authentication codes, a controller to extract a content authentication code by determining that the memory card is inserted into the card insertion unit, and to stream or download a lossless audio source corresponding to the content authentication code by transmitting the content authentication code to a content server, and a storage unit to store the lossless audio source streamed or downloaded by the controller.

The foregoing and/or other aspects and utilities of the present general inventive concept may also be achieved by providing a ubiquitous audio reproducing apparatus including a controller to receive a lossy audio source and a content authentication code of the lossy audio source from an external memory card, to transmit the content authentication code to an external content server, and to receive a lossless audio source corresponding to the lossy audio source according to a response to the transmitted content authentication code from the external content server.

The ubiquitous audio reproducing apparatus may further include a storage unit to receive and store the lossy audio source and the content authentication code of the lossy audio source.

The ubiquitous audio reproducing apparatus may further include a card insertion unit to receive the external memory card storing the lossy audio source and the content authentication code, and the controller receives the lossy audio source and the content authentication code when the external memory is inserted into the card insertion unit.

The ubiquitous audio reproducing apparatus may further include a display to display information on the lossy audio source and the content authentication code, and a card insertion unit to receive an external memory card storing the lossy audio source and the content authentication code.

The ubiquitous audio reproducing apparatus may further include a display to display information on the lossy audio source and the lossless audio source.

The controller may generate an audio signal corresponding to one of the lossy audio source and the lossless audio source to reproduce the one of the lossy audio source and the lossless audio source.

The lossy audio source may include data to reproduce a first format of an original audio signal, and the lossless audio source may include data to reproduce a second format of the original audio signal.

The lossy audio source may include data to reproduce a first resolution of an original audio signal, and the lossless audio source may include data to reproduce a second resolution of the original audio signal higher than the first resolution.

The foregoing and/or other aspects and utilities of the present general inventive concept may also be achieved by providing a method of a ubiquitous audio reproducing apparatus, the method including receiving a lossy audio source and a content authentication code of the lossy audio source from an external memory card, transmitting the content authentication code to an external content server, and receiving a lossless audio source corresponding to the lossy audio source according to a response to the transmitted content authentication code from the external content server.

The foregoing and/or other aspects and utilities of the present general inventive concept may also be achieved by providing a computer-readable medium containing computer-readable codes as a program to execute a method of a ubiquitous audio reproducing apparatus, the method including receiving a lossy audio source and a content authentication code of the lossy audio source from an external memory card, transmitting the content authentication code to an external content server, and receiving a lossless audio source corresponding to the lossy audio source according to a response to the transmitted content authentication code from the external content server.

The foregoing and/or other aspects and utilities of the present general inventive concept may also be achieved by providing ubiquitous audio reproducing system including a ubiquitous audio reproducing apparatus to receive a lossy audio source and a content authentication code of the lossy audio source from an external memory card, to transmit the content authentication code to an external device, and to receive a lossless audio source corresponding to the lossy audio source according to a response to the transmitted content authentication code from the external device, and an external content server connectable to the ubiquitous audio reproducing apparatus as the external device to receive the transmitted content authentication code, and to transmit the lossless audio source corresponding to the lossy audio source according to the received content authentication code, to the ubiquitous audio reproducing apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1B is a configuration of a home network system to which a ubiquitous audio reproducing method according to an embodiment of the present general inventive concept is applied;

DETAILED DESCRIPTION OF THE PREFERRED EMBODIMENTS

Figure 1A:
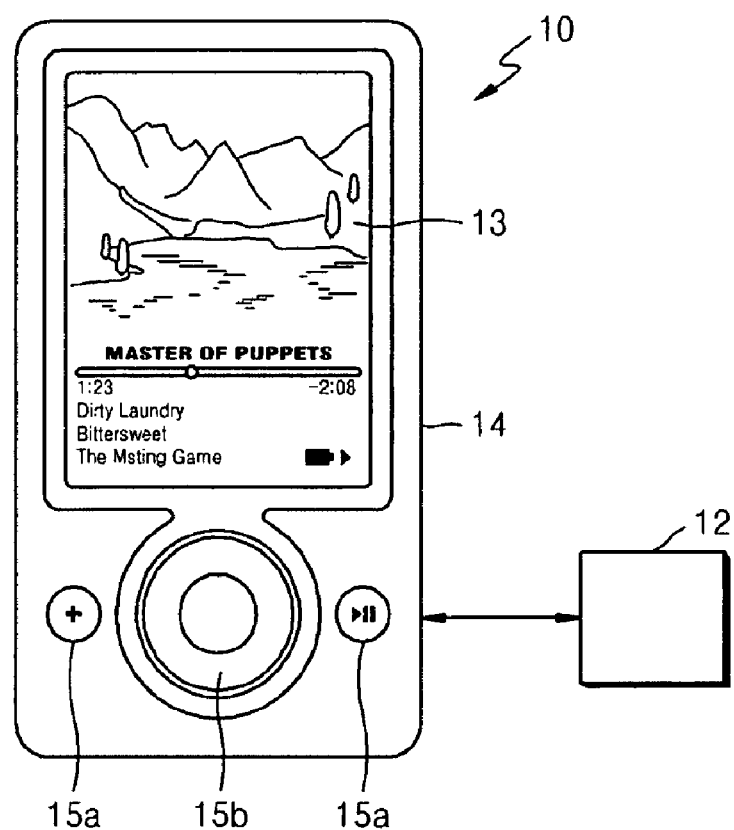
FIG. 1A is a top view of a mobile device to which a ubiquitous audio reproducing method according to an embodiment of the present general inventive concept is applied.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIGS. 1A and 1B are diagrams illustrating a ubiquitous audio system according to an embodiment of the present general inventive concept.

FIG. 1A is a top view of a mobile device 10 as a portion of the ubiquitous audio system to which a ubiquitous audio reproducing method according to an embodiment of the present general inventive concept is applied.

Referring to FIG. 1A, if a memory card 12 is inserted into the mobile device 10, the mobile device immediately reproduces one or more lossy audio sources stored in the memory card. The memory card 12 is sold by a content provider and stores the lossy audio sources encoded in a lossy coder/decoder (codec) method, content information of a meta file format, and content authentication codes. The lossy audio sources are processed by Digital Right Management (DRM). In this case, since the mobile device 10 is portable, the lossy audio sources of low sound quality will be acceptable.

Thus, the mobile device 10 determines whether the memory card 12 storing the lossy audio sources and their authentication codes is inserted thereto, and if it is determined that the memory card 12 is inserted, the mobile device 10 displays information (lossy audio source information) 13 on the lossy audio sources on a screen 14 and reproduces a lossy audio source selected from the lossy audio source information. The mobile device 10 may include key buttons 15a, 15b, and 15c to control operations of the mobile device 10.

FIG. 1B is a configuration of a home network system to which the ubiquitous audio reproducing method according to an embodiment of the present general inventive concept is applied.

Referring to FIG. 1B, the home network system includes a home audio system 110 and a content server 120 connected to a Content Provider (CP) 130 via a network, such as a wired or wireless network or the Internet. The home audio system 110 includes an Access Point (AP), an audio reproducing apparatus 114, which can perform network communication via the AP, and a memory card 112. The memory card 112 can be sold by the CP 130 and stores audio sources encoded in a lossy codec method, content information of a meta file format, and content authentication codes. The memory card 112 can be used as an authentication key for allowing an access to lossless audio sources provided by the CP 130. The lossy audio sources are processed by the DRM. Each content authentication code corresponds to a lossless content Identifier (ID) provided by the CP 130.

The home audio system 110 determines whether the memory card 112 storing the lossy audio sources and their authentication codes is inserted, extracts a content authentication code as the authentication key from the inserted memory card 112, transmits the extracted content authentication code and a unique ID to the content server 120, and if the use of a lossy audio source corresponding to the content authentication code is allowed by the content server 120, streams or downloads a lossless audio source corresponding to the content authentication code from the content server 120.

The content server 120 receives the content authentication code extracted from the memory card 112 of the home audio system 110, determines based on the received content authentication code whether a relevant content of the content authentication code is a genuine content, requests lossless content corresponding to the content authentication code from the CP 130, and provides the lossless content to the home audio system 110. A method of transmitting the lossless audio source can be a Pulse Width Modulation (PWM) method or any of other various modulation methods.

The CP 130 sells the memory card 112 storing lossy audio sources and their audio content authentication codes in offline and online shops and manages lossless audio sources of the sold lossy audio sources. Accordingly, the audio reproducing apparatus can reproduce the stored lossy audio sources and/or the lossless audio sources received from the CP 130. The lossless audio sources have a higher resolution than the low resolution of the lossy audio sources.

Figures 2, 3:
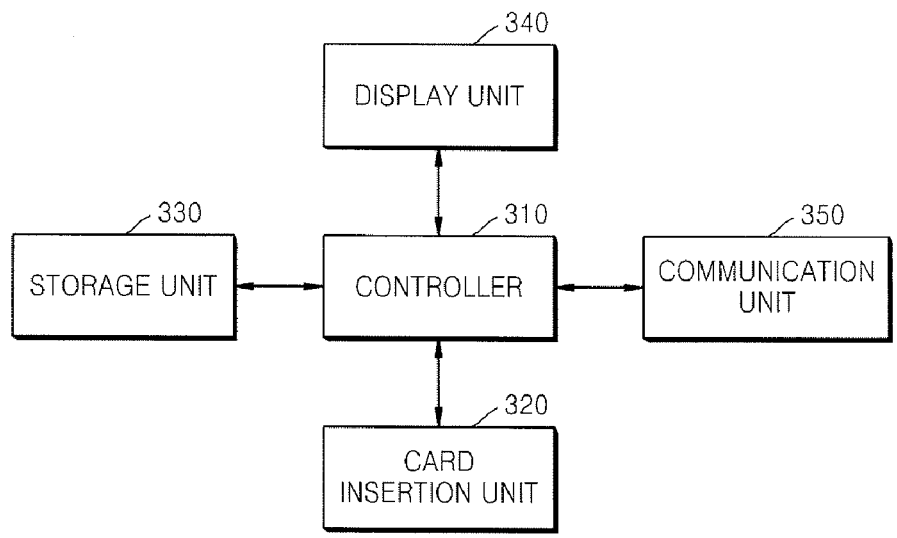
FIG. 2 is a structure of data stored in a memory card according to an embodiment of the present general inventive concept.
FIG. 3 is a block diagram illustrating the home audio system of FIG. 1.

FIG. 2 is a structure of data stored in a memory card according to an embodiment of the present invention.

Referring to FIG. 2, the memory card stores audio data, artists, titles, genres, a website of a content server, and authentication codes. The memory card is sold by the CP 130 and stores additional information regarding audio data of the lossy audio sources, e.g., artists, titles, authentication codes, and the like, in the meta file format. The content information may include a location or a connection method of the content server 120 to connect the audio reproducing apparatus 114 to the content server 120. The content server 120 determines whether lossy content is genuine and gets an audio name, based on an authentication code. The audio data of the lossy content is encoded in a lossy codec method.

FIG. 3 is a block diagram of the home audio system 110 of FIGS. 1A and 1B.

The home audio system 110 includes a controller 310, a card insertion unit 320, a storage unit 330, a display unit 340, and a communication unit 350.

Referring to FIGS. 1A-3, the card insertion unit 320 accepts a memory card storing the lossy audio sources.

The storage unit 330 stores streamed or downloaded lossless audio sources. The storage unit 330 may be accomplished with a Hard Disk Drive (HDD) or a flash memory.

The display unit 340 displays on a screen thereof information on content and a message provided by the CP 130.

The communication unit 350 transmits and receives audio content and content information to and from the content server 120 or the CP 130 via a modem in a wired or wireless manner.

The controller 310 determines that a memory card storing one or more lossy audio sources and their audio content authentication codes is inserted into the card insertion unit 320, extracts a content authentication code from the memory card and automatically connects to a website of a content server stored in the memory card, transmits the content authentication code to the content server 120 via the communication unit 350, and streams or downloads a lossless audio source corresponding to the content authentication code if a content authentication operation in the content server 120 is successfully completed, and stores the lossless audio source in the storage unit 330. The controller 310 also receives content related information from the content server 120 and displays the content related information on the display unit 340, and displays information on the streaming content on the display unit 340.

Figure 4:
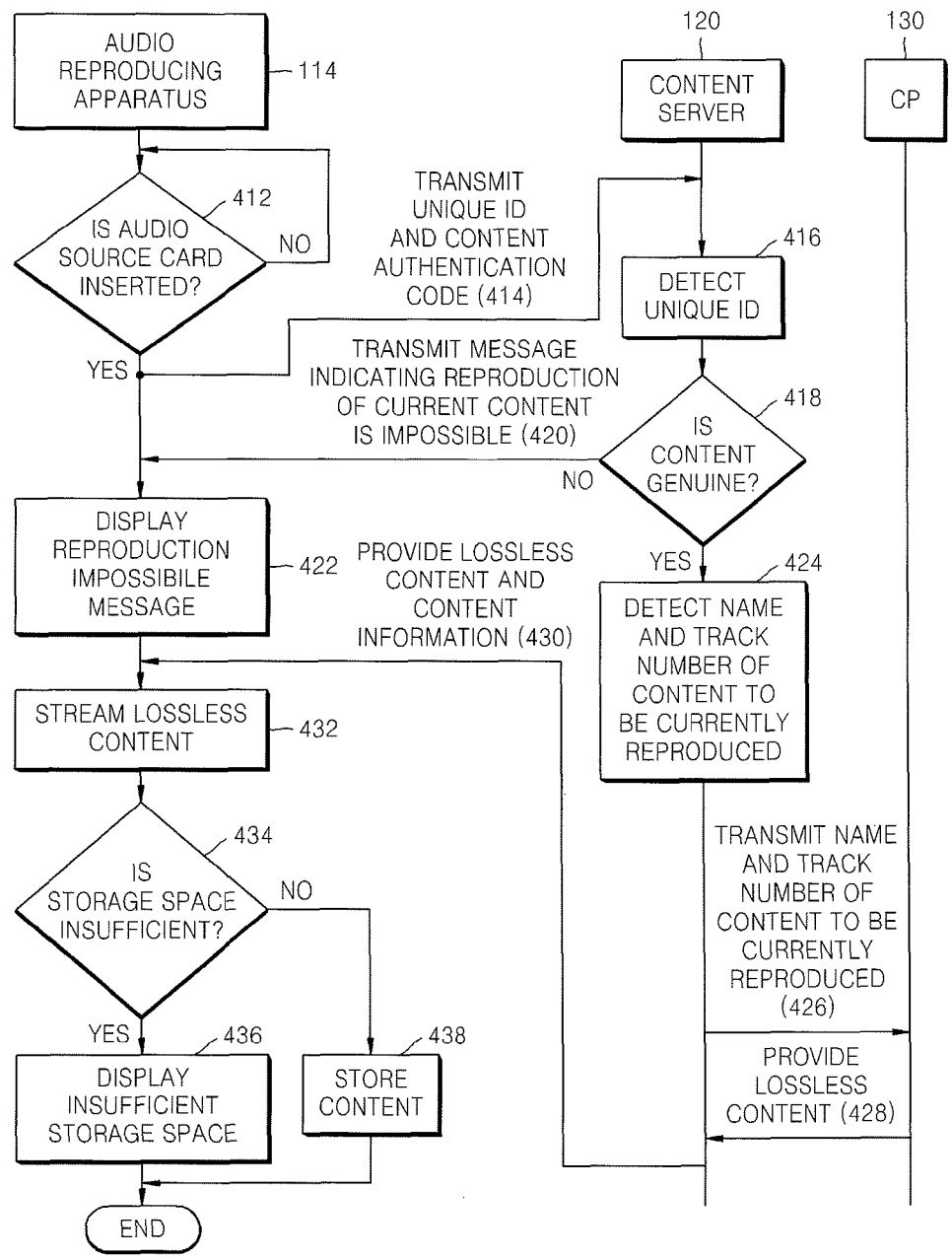
FIG. 4 is a flowchart illustrating a ubiquitous audio servicing method according to an embodiment of the present general inventive concept.

FIG. 4 is a flowchart of a ubiquitous audio servicing method according to an embodiment of the present general inventive concept.

Referring to FIGS. 1B and 4, a user buys a memory card 112 storing lossy audio sources. The memory card 112 is sold in an online or offline shop by the CP 130.

The audio reproducing apparatus 114 determines in operation 412 whether the memory card storing lossy audio sources is inserted.

If it is determined in operation 412 that the memory card 112 is inserted, the audio reproducing apparatus 114 extracts each content authentication code from the memory card 112. Simultaneously, the audio reproducing apparatus 114 connects to a website of the content server 120, which is stored in the memory card 112, and transmits a system unique ID of the audio reproducing apparatus 114 and a content authentication code of each lossy audio source to the content server 120 in operation 414.

The content server 120 determines in operation 416 whether the unique ID of the audio reproducing apparatus 114 is registered.

If it is determined in operation 416 that the unique ID is registered, the content server 120 determines based on billing information in operation 418 whether lossy content corresponding to each content authentication code is genuine. The audio reproducing apparatus 114 may receive from the content server 120 the billing information including a history of the content sold in online and offline shops.

If it is determined in operation 418 that the lossy content is not genuine, the content server 120 transmits a message indicating that reproduction of current content is impossible to the audio reproducing apparatus 114 in operation 420. The audio reproducing apparatus 114 displays a message indicating that reproduction of a current content is impossible on a screen in operation 422.

If it is determined in operation 418 that the lossy content is genuine, the content server 120 detects a pre-set name and track number of the current content from the authentication code in operation 424.

The content server 120 transmits the name and track number of the current content to the CP 130 in operation 426.

The CP 130 transmits lossless content corresponding to the name and track number of the current content to the content server 120 in operation 428.

The content server 120 provides the lossless content corresponding to the content authentication code and information regarding the lossless content to the audio reproducing apparatus 114 in operation 430. As another embodiment, the content server 120 provides an advertisement message of media recommended by the CP 130 to the audio reproducing apparatus 114 so that the user can buy any of them in online. Settlement and purchase can be performed using a credit card reader. That is, the user can perform the online settlement and purchase using a bank authentication key.

The audio reproducing apparatus 114 simultaneously streams or downloads the lossless content and the information provided by the content server 120 in operation 432. In this case, the audio reproducing apparatus 114 displays the information regarding the lossless content on a screen when streaming the lossless content.

In operation 434, the audio reproducing apparatus 114 periodically checks a storage space of a storage medium, such as an HDD, in which the lossless content is stored while streaming or downloading the lossless content. If the storage space of the storage medium is insufficient, the audio reproducing apparatus 114 displays a message indicating that the storage space is insufficient on the screen in operation 436. If the storage space of the storage medium is sufficient, the audio reproducing apparatus 114 stores the lossless content in operation 438. The audio reproducing apparatus 114 has a system structure easy to expand storage space as a Redundant Array of Independent Disks (RAID) type.

The audio reproducing apparatus 114 generates key words, such as music, DRM, copyright, and CP, based on the streamed or downloaded audio content information and edits a search expression based on the key words.

In addition, the audio reproducing apparatus 114 can support a jukebox function, such as random reproduction, artist-based reproduction, genre-based reproduction, and user-rating-based reproduction, using the downloaded audio content information.

In addition, in order to protect copyright between the CP 130 and artists, the audio reproducing apparatus 114 constructs a file system so that audio sources stored in a storage medium, such as an HDD, cannot be compatible with a Personal Computer (PC)

The invention can also be embodied as computer readable codes on a computer readable medium. The computer-readable medium may include a computer-readable medium. The computer-readable medium can include computer-readable recording medium and a computer-readable transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer-readable transmission medium can also be distributed over network coupled computer systems so that the computer readable code is stored and executed in a distributed fashion. The computer-readable transmission medium can transmit carrier waves and signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, a memory card storing only lossy audio sources is used as an authentication key for allowing an access to lossless audio sources. A home audio system can stream or download a lossy audio source provided by a CP by connecting to a content server using the authentication key, making a user enjoy hi-fi audio and protecting the right of the CP.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A ubiquitous audio reproducing method comprising:
    determining whether a memory card storing one or more lossy audio sources and one or more authentication codes corresponding to the one or more lossy audio sources is inserted;
    if it is determined that the memory card is inserted, extracting the one or more authentication codes stored in the memory card and automatically connecting to a website via a controller, the website corresponding to a content server that stores content corresponding to the lossy audio source stored in the memory card;
    if it is determined that the memory card is inserted, transmitting an authentication code of a lossy audio source in the memory card and a system unique Identifier (ID) to a content server by connecting to the content server via a network; and
    if the content server allows the use of a lossless audio source corresponding to the lossy audio source using the authentication code, streaming and downloading the lossless audio source and contents information from the content server.

2. The ubiquitous audio reproducing method of claim 1, further comprising:
    displaying content information on a screen when the lossless audio source is streamed.

3. The ubiquitous audio reproducing method of claim 1, further comprising:
    displaying storage space information of a storage medium to store the downloaded lossless audio source on the screen.

4. The ubiquitous audio reproducing method of claim 1, further comprising:
    generating one or more key words based on the streamed or downloaded audio content information: and
    editing a search expression based on the key words.

5. The ubiquitous audio reproducing method of claim 1, further comprising:
    forming the downloaded and stored lossless audio source as a file system incompatible with a Personal Computer (PC).

6. The ubiquitous audio reproducing method of claim 1, wherein the lossy audio source is audio data encoded in a compression codec method.

7. The ubiquitous audio reproducing method of claim 1, wherein the lossless audio source is received in a Pulse Width Modulation (PWM) method.

8. A method of reproducing ubiquitous audio in a mobile device, the method comprising:
    determining whether a memory card storing one or more lossy audio sources and one or more authentication codes corresponding to the one or more lossy audio sources is inserted;
    if it is determined that the memory card is inserted, extracting the one or more authentication codes from the memory card and automatically connecting to a website of a content server that stores content corresponding to the lossy audio source stored in the memory card via a controller, and displaying information on the lossy audio sources; and
    reproducing a lossy audio source selected from the displayed lossy audio source information.

9. A ubiquitous audio servicing method comprising:
    generating an authentication key using a memory card storing lossy audio sources and content authentication codes;
    receiving a content authentication code in the memory card and a unique Identifier (ID) of a home audio system into which the memory card is inserted from the home audio system;
    determining based on the received content authentication code whether relevant content is genuine; and
    providing a lossless audio source corresponding to the content authentication code to the home audio system according to whether the relevant content is genuine.

10. The ubiquitous audio servicing method of claim 9, further comprising:
    transmitting a message indicating that content reproduction is impossible to the home audio system if it is determined that the lossy content is not genuine.

11. The ubiquitous audio servicing method of claim 9, wherein the lossless audio source is transmitted in a Pulse Width Modulation (PWM) method.

12. A ubiquitous audio reproducing apparatus comprising:
    a card insertion unit to receive a memory card storing one or more lossy audio sources and content authentication codes;
    a controller to extract a content authentication code stored in the memory card and to automatically connect to a website of a content server that stores content corresponding lossy audio source stored in the memory card by determining that the memory card is inserted into the card insertion unit, and streaming and downloading a lossless audio source corresponding to the content authentication code by transmitting the content authentication code to a content server; and a storage unit to store the lossless audio source streamed and downloaded by the controller.

13. The ubiquitous audio reproducing apparatus of claim 12, further comprising:

a display unit to display information on the content and a content information message provided by a content provider.

14. A non-transitory computer readable recording medium storing a computer readable program for executing a ubiquitous audio reproducing method comprising:

determining whether a memory card storing one or more lossy audio sources and one or more authentication codes corresponding to the one or more lossy audio sources is inserted;

if it is determined that the memory card is inserted, transmitting an authentication code of a lossy audio source in the memory card and a system unique Identifier (ID) to a content server by connecting to the content server via a network; and if content authentication succeeds by the content server, streaming and downloading a lossless audio source corresponding to the content authentication code from the content server.

* * * * *